(12) United States Patent
Hoppe et al.

(10) Patent No.: US 7,765,837 B2
(45) Date of Patent: Aug. 3, 2010

(54) CLOTHES WASHER ACCELERATING SYSTEMS AND METHODS

(75) Inventors: Christopher Gregory Hoppe, Louisville, KY (US); Larry Lee Hawkins, Louisville, KY (US); Derek Lee Watkins, Elizabethtown, KY (US); Mark Aaron Weaver, Crestwood, KY (US); Michael Francis Finch, Louisville, KY (US); Stephen Bernard Froelicher, Shepherdsville, KY (US); Benton Bartley Oukrop, Jeffersonville, IN (US)

(73) Assignee: General Electric Company, Schenectady, NY (US)

( * ) Notice: Subject to any disclaimer, the term of this patent is extended or adjusted under 35 U.S.C. 154(b) by 1136 days.

(21) Appl. No.: 11/013,584

(22) Filed: Dec. 16, 2004

(65) Prior Publication Data

US 2006/0130242 A1 Jun. 22, 2006

(51) Int. Cl.
*D06F 33/00* (2006.01)
*D06F 21/00* (2006.01)
(52) U.S. Cl. ...................... 68/12.16; 68/139
(58) Field of Classification Search ............... 68/12.16, 68/139; 8/158, 159
See application file for complete search history.

(56) References Cited

U.S. PATENT DOCUMENTS

| 5,076,076 | A | | 12/1991 | Payne |
| 5,293,760 | A | * | 3/1994 | Tani et al. ............... 68/12.02 |
| 5,325,677 | A | | 7/1994 | Payne et al. |
| 5,475,290 | A | * | 12/1995 | Tani et al. ............... 318/434 |
| 5,561,990 | A | | 10/1996 | Berkcan et al. |
| 5,752,397 | A | | 5/1998 | Bruntz |
| 5,906,254 | A | | 5/1999 | Schmidt et al. |
| 6,578,225 | B2 | | 6/2003 | Jonsson |

\* cited by examiner

*Primary Examiner*—Michael Kornakov
*Assistant Examiner*—Stephen Ko
(74) *Attorney, Agent, or Firm*—George L. Rideout, Esq.; Armstrong Teasdale LLP

(57) ABSTRACT

A washing machine includes a cabinet, a tub mounted within the cabinet, and a basket rotationally mounted within the tub for relative rotation therewith. A suspension assembly supports the tub within the cabinet. A variable speed motor is included for rotating the basket about a rotation axis, and an inverter is operatively coupled to the motor. A controller is operatively coupled to the inverter and the motor and is configured to control the motor based on a drag torque on the basket.

11 Claims, 5 Drawing Sheets

CLOTHES WASHER ACCELERATING SYSTEMS AND METHODS

BACKGROUND OF THE INVENTION

This invention relates generally to washing machines, and more particularly, to systems and methods for accelerating an unbalanced washer basket.

Known washing machines typically include a cabinet that houses an outer tub for containing wash and rinse water, a perforated laundry item basket within the tub, and an agitator within the basket. A drive and motor assembly is mounted underneath the stationary outer tub to rotate the basket and the agitator relative to one another. Water is extracted from the laundry items by revolving the perforated laundry item containing the laundry items at a high rotational velocity. Centrifugal forces pull the majority of the water out of the laundry items and through the holes in the rotating basket. A pump assembly pumps water from the machine to a drain to execute a wash cycle. In known washing machines the rotating basket is supported by a suspension system designed to dampen translational motion induced by any imbalance with in the rotating basket. High stresses are sometimes encountered within the basket, drive system, and suspension system during the high-speed spin action used for water extraction during normal wash cycles. With an imbalance within the load, a force is generated which is proportional to the product of the mass, the distance between the imbalance and the center of rotation, and the square of the velocity. Small imbalances can very easily generate large forces as a result of the high rotational velocities.

Some known washing machines may employ a sensor to determine if the machine is operating with an unbalanced load. If an unbalanced load is detected during an extraction spin cycle, the machine is stopped and a signal is generated to alert the user to the unbalanced load. Other machines are configured to measure the unbalance and then decide if the unbalance is too large or if it is desirable to increase speed. For spin speeds in excess of 630 rpm, the basket speed must be prevented from exceeding the design limits of the basket. At low speeds, motor load cannot be used to determine an unbalance because a brake drag provides a load on the motor in addition to the load provided by any imbalance.

BRIEF DESCRIPTION OF THE INVENTION

In one aspect, a washing machine is provided. The washing machine includes a cabinet, a tub mounted within the cabinet, and a basket rotationally mounted within the tub for relative rotation therewith. A suspension assembly supports the tub within the cabinet. A variable speed motor is included for rotating the basket about a rotation axis, and an inverter is operatively coupled to the motor. A controller is operatively coupled to the inverter and the motor and is configured to control the motor based on a drag torque on the basket.

In another aspect, a method of accelerating an unbalanced washer basket assembly during a spin cycle, is provided, the washer basket assembly including the basket and a tub supported by a suspension system in a washing machine. The method includes accelerating the basket to a rotational speed above a natural resonant frequency (NRF) of the basket assembly, holding the basket at the rotational speed above the NRF for a first time period, and operating the washer motor at a constant torque until a torque transmitted to the basket from the washer motor is substantially equal to a drag torque on the basket.

In another aspect, a system is provided for accelerating an unbalanced basket assembly above a natural resonant frequency (NRF) and reducing an out-of-balance condition in a washing machine having a cabinet and a tub enclosing a washer basket rotatably mounted within the tub. The washing machine includes a variable speed motor assembly for spinning the basket about a spin axis during a spin cycle. The tub is susceptible to an out-of-balance condition characterized by excursions of the tub in a direction generally perpendicular to the spin axis during the spin cycle. The system includes an inverter operatively coupled to the variable speed motor and a controller coupled to the inverter, wherein the controller directs the inverter to operate the motor to accelerate the basket to a rotational speed below the NRF for a predetermined time period, thereby extracting water from the basket to reduce a size of the unbalance in the basket prior to accelerating the basket above the NRF.

DETAILED DESCRIPTION OF THE INVENTION

Figure 1:
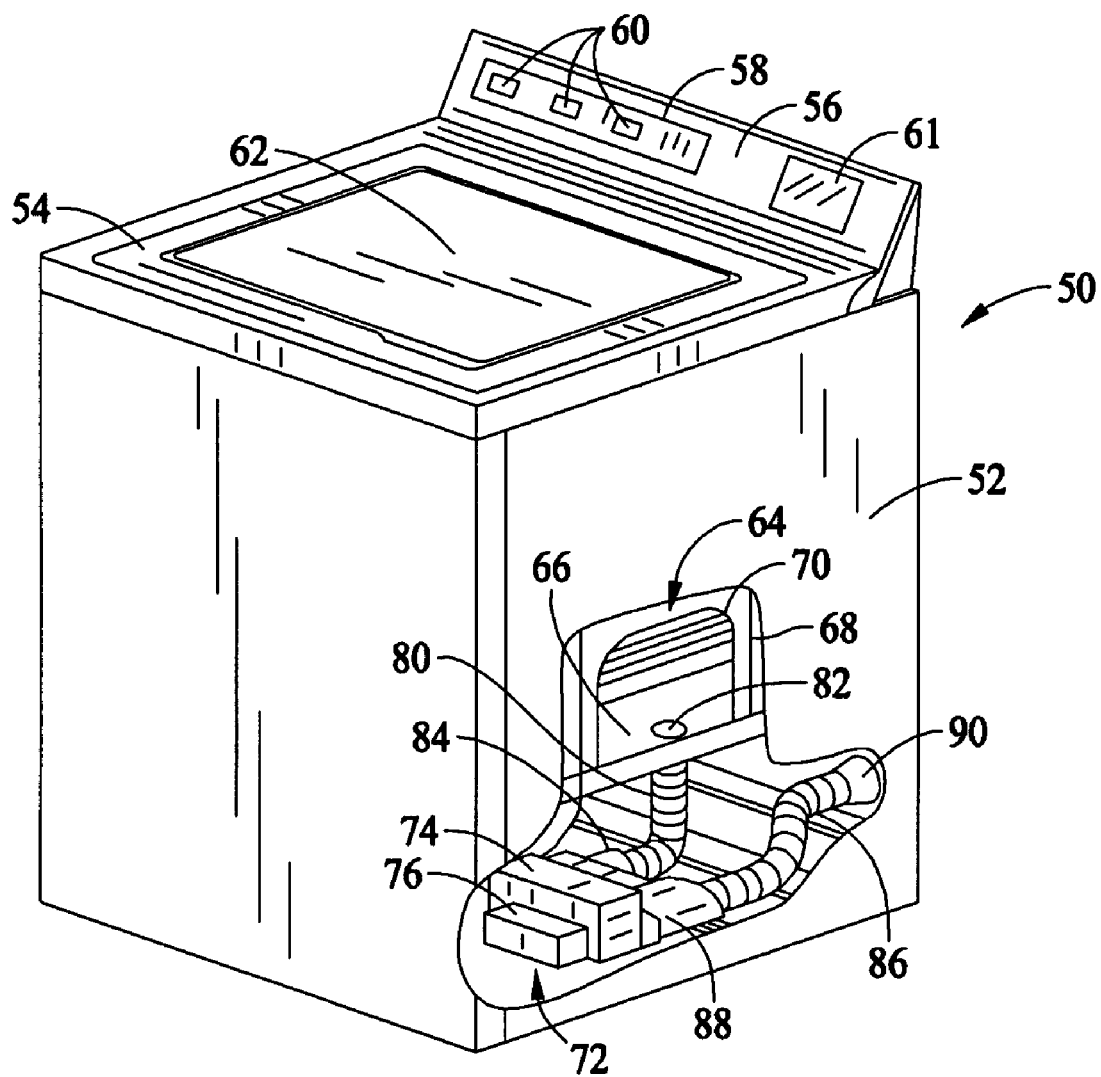
FIG. 1 is a perspective view partially broken away of an exemplary washing machine.

FIG. 1 is a perspective view partially broken away of an exemplary washing machine 50 including a cabinet 52 and a cover 54. A backsplash 56 extends from cover 54, and a control panel 58 including a plurality of input selectors 60 is coupled to backsplash 56. Control panel 58 and input selectors 60 collectively form a user interface input for operator selection of machine cycles and features, and in one embodiment a display 61 indicates selected features, a countdown timer, and other items of interest to machine users. A lid 62 is mounted to cover 54 and is rotatable about a hinge (not shown) between an open position (not shown) facilitating access to a wash tub 64 located within cabinet 52, and a closed position (shown in FIG. 1) forming a sealed enclosure over wash tub 64. As illustrated in FIG. 1, machine 50 is a vertical axis washing machine.

Tub 64 includes a bottom wall 66 and a sidewall 68, and a basket 70 is rotatably mounted within wash tub 64. A pump assembly 72 is located beneath tub 64 and basket 70 for gravity assisted flow when draining tub 64. Pump assembly 72 includes a pump 74 and a motor 76. A pump inlet hose 80 extends from a wash tub outlet 82 in tub bottom wall 66 to a pump inlet 84, and a pump outlet hose 86 extends from a pump outlet 88 to an appliance washing machine water outlet 90 and ultimately to a building plumbing system discharge line (not shown) in flow communication with outlet 90.

Figure 2:
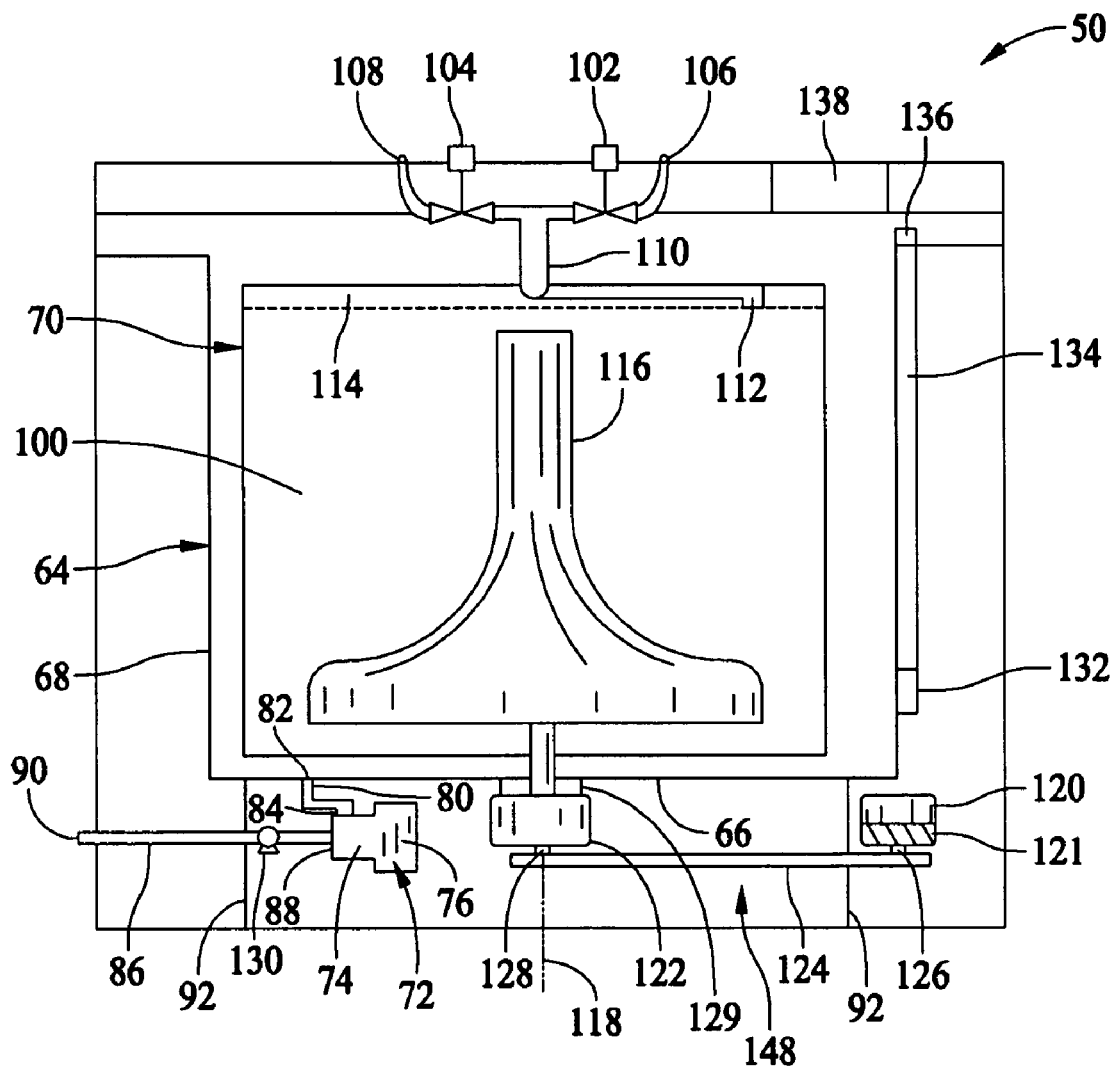
FIG. 2 is front elevational schematic view of the washing machine shown in FIG. 1.

FIG. 2 is a front elevational schematic view of washing machine 50 including wash basket 70 movably disposed and rotatably mounted in wash tub 64 in a spaced apart relationship from tub side wall 64 and tub bottom 66. Basket 70 includes a plurality of perforations therein to facilitate fluid communication between an interior of basket 70 and wash tub 64.

A hot liquid valve 102 and a cold liquid valve 104 deliver fluid, such as water, to basket 70 and wash tub 64 through a respective hot liquid hose 106 and a cold liquid hose 108. Liquid valves 102, 104 and liquid hoses 106, 108 together form a liquid supply connection for washing machine 50 and, when connected to a building plumbing system (not shown), provide a fresh water supply for use in washing machine 50. Liquid valves 102, 104 and liquid hoses 106, 108 are connected to a basket inlet tube 110, and fluid is dispersed from inlet tube 110 through a known nozzle assembly 112 having a number of openings therein to direct washing liquid into basket 70 at a given trajectory and velocity. A known dispenser (not shown in FIG. 2), may also be provided to produce a wash solution by mixing fresh water with a known detergent or other composition for cleansing of articles in basket 70.

In an alternative embodiment, a known spray fill conduit 114 (shown in phantom in FIG. 2) may be employed in lieu of nozzle assembly 112. Along the length of the spray fill conduit 114 are a plurality of openings arranged in a predetermined pattern to direct incoming streams of water in a downward tangential manner towards articles in basket 70. The openings in spray fill conduit 114 are located a predetermined distance apart from one another to produce an overlapping coverage of liquid streams into basket 70. Articles in basket 70 may therefore be uniformly wetted even when basket 70 is maintained in a stationary position.

A known agitation element 116, such as a vane agitator, impeller, auger, or oscillatory basket mechanism, or some combination thereof is disposed in basket 70 to impart an oscillatory motion to articles and liquid in basket 70. In different embodiments, agitation element 116 may be a single action element (i.e., oscillatory only), double action (oscillatory movement at one end, single direction rotation at the other end) or triple action (oscillatory movement plus single direction rotation at one end, singe direction rotation at the other end). As illustrated in FIG. 2, agitation element 116 is oriented to rotate about a vertical axis 118.

Basket 70 and agitator 116 are driven by a motor 120 through a transmission and clutch system 122. In an exemplary embodiment, motor 120 is a variable speed motor. A transmission belt 124 is coupled to respective pulleys of a motor output shaft 126 and a transmission input shaft 128. Thus, as motor output shaft 126 is rotated, transmission input shaft 128 is also rotated. Clutch system 122 facilitates driving engagement of basket 70 and agitation element 116 for rotatable movement within wash tub 64, and clutch system 122 facilitates relative rotation of basket 70 and agitation element 116 for selected portions of wash cycles. Motor 120, transmission and clutch system 122, and agitation element 116 collectively are referred herein as a machine drive system 148.

Basket 70, tub 64, and machine drive system 148 are supported by a vibration dampening suspension system 92. Washing machine suspension systems are well known in the art and have one or more identifiable natural resonant frequencies (NRF). In the exemplary embodiment, suspension system 92 has one unique NRF. In another embodiment, suspension system 92 has two NRFs. As the mass of the laundry items increases, the loading of suspension system 92 is altered, and the NRF is slightly modified. That is, as the laundry item load increases, the NRF decreases.

If laundry items (i.e. a load) are placed in the basket and spun without any imbalance algorithm, the basket and the laundry items will reach one of three possible states. The first possible state is a full spin which occurs when the load is sufficiently balanced to pass through a first NRF and if present a second NRF. The second state is a spin where some portion of the moving system strikes some portion of the stationary support structure. Typically basket 70 strikes tub 64. This second state occurs when the laundry items are unbalanced and basket 70 cannot pass through the first NRF. As basket 70 approaches the first NRF, an increasing amount of energy is used in the translational motion of basket 70 rather than the rotational motion of basket 70. Eventually the speed will reach an equilibrium point. If the speed increases, more energy is diverted to the translational motion and the rotational energy is no longer sufficient to overcome the frictional losses of the rotating system. As a result, basket 70 will slow down to the speed at which the rotational energy is equal to the rotational frictional losses. The third state is similar to the second state except that the second NRF is the speed of interest and the imbalance is small enough to allow the basket 70 to pass through the first NRF but not the second.

In the second and third states, basket 70 strikes tub 64 when the equilibrium speeds are reached and the machine 50 may start "walking" which results in excessive mechanical wear in suspension system 92 and drive system 148. In each of the second and third states, it is desirable to operate washing machine 50 at a spin speed (i.e., terminal spin speed) lower than the equilibrium speed. By determining the size of the load, which in turn estimates the NRFs, and determining the nature of the imbalance, the terminal spin speed may be adjusted to a point below the equilibrium speed.

Washing machine 50 also includes a brake assembly 129 selectively applied (drag) or released (lift) for respectively maintaining basket 70 in a stationary position within tub 64 or for allowing basket 70 to spin within tub 64. Pump assembly 72 is selectively activated to remove liquid from basket 70 and tub 64 through drain outlet 90 and a drain valve 130 during appropriate points of washing cycles. In an exemplary embodiment, machine 50 also includes a reservoir 132, a tube 134, and a pressure sensor 136. As fluid levels rise in wash tub 64, air is trapped in reservoir 132 creating a pressure in tube 134, that pressure sensor 136 monitors. Liquid levels, and more specifically, changes in liquid levels in wash tub 64 may therefore be sensed, for example, to indicate laundry loads and to facilitate associated control decisions. In further and alternative embodiments, load size and cycle effectiveness may be determined or evaluated using other known indicia, such as motor spin, torque, load weight, motor current, and voltage or current phase shifts.

Operation of machine 50 is controlled by a controller 138 which is operatively coupled to the user interface input located on washing machine backsplash 56 (shown in FIG. 1) for user manipulation to select washing machine cycles and features. In response to user manipulation of the user interface input, controller 138 operates the various components of machine 50 to execute selected machine cycles and features.

In an illustrative embodiment, laundry items are loaded into basket 70, and washing operation is initiated through operator manipulation of control input selectors 60 (shown in FIG. 1). Tub 64 is filled with water and mixed with detergent to form a wash fluid, and basket 70 is agitated with agitation element 116 for cleansing of laundry items in basket 70. That is, agitation element is moved back and forth in an oscillatory back and forth motion. In the illustrated embodiment, agitation element 116 is rotated clockwise a specified amount about the vertical axis of the machine, and then rotated counterclockwise by a specified amount. The clockwise/counterclockwise reciprocating motion is sometimes referred to as a stroke, and the agitation phase of the wash cycle constitutes a number of strokes in sequence. Acceleration and deceleration of agitation element 116 during the strokes imparts mechanical energy to articles in basket 70 for cleansing action. The strokes may be obtained in different embodiments with a reversing motor, a reversible clutch, or other known reciprocating mechanism.

After the agitation phase of the wash cycle is completed, tub 64 is drained with pump assembly 72. Laundry items are then rinsed and portions of the cycle repeated, including the agitation phase, depending on the particulars of the wash cycle selected by a user.

Figure 3:
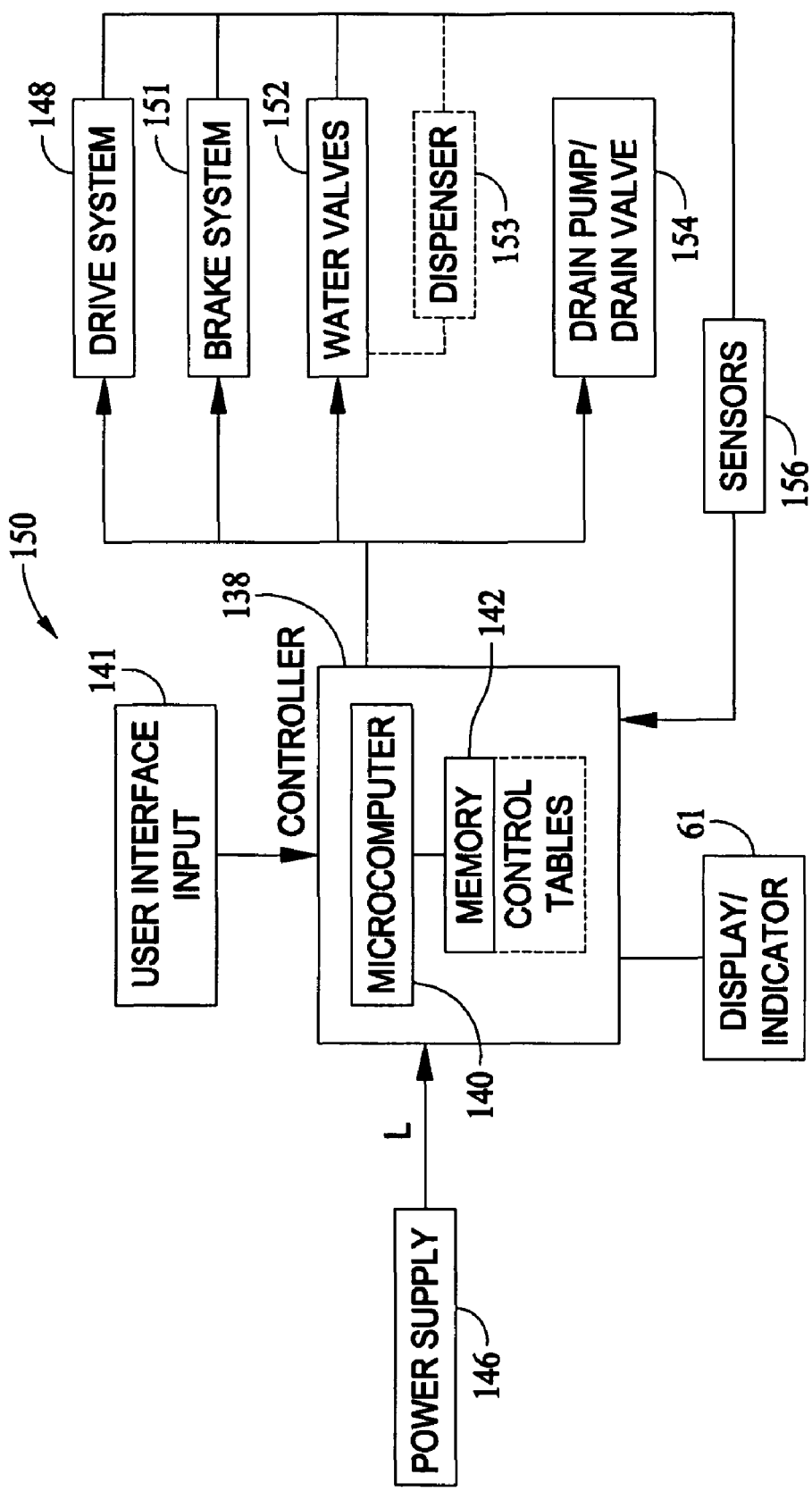
FIG. 3 is a schematic block diagram of a control system of the washing machine shown in FIGS. 1 and 2.

FIG. 3 is a schematic block diagram of an exemplary washing machine control system 150 for use with washing machine 50 (shown in FIGS. 1 and 2). Control system 150 includes controller 138 which may, for example, be a microcomputer 140 coupled to a user interface input 141. An operator may enter instructions or select desired washing machine cycles and features via user interface input 141, such as through input selectors 60 (shown in FIG. 1) and a display or indicator 61 coupled to microcomputer 140 displays appropriate messages and/or indicators, such as a timer, and other known items of interest to washing machine users. A memory 142 is also coupled to microcomputer 140 and stores instructions, calibration constants, and other information as required to satisfactorily complete a selected wash cycle. Memory 142 may, for example, be a random access memory (RAM). In alternative embodiments, other forms of memory could be used in conjunction with RAM memory, including but not limited to flash memory (FLASH), programmable read only memory (PROM), and electronically erasable programmable read only memory (EEPROM).

Power to control system 150 is supplied to controller 138 by a power supply 146 configured to be coupled to a power line L. Analog to digital and digital to analog converters (not shown) are coupled to controller 138 to implement controller inputs and executable instructions to generate controller output to washing machine components such as those described above in relation to FIGS. 1 and 2. More specifically, controller 138 is operatively coupled to machine drive system 148 (e.g., motor 120, inverter drive 121, clutch system 122, and agitation element 116 shown in FIG. 2), a brake assembly 151 associated with basket 70 (shown in FIG. 2), machine water valves 152 (e.g., valves 102, 104 shown in FIG. 2) and machine drain system 154 (e.g., drain pump assembly 72 and/or drain valve 130 shown in FIG. 2) according to known methods. In a further embodiment, water valves 152 are in flow communication with a dispenser 153 (shown in phantom in FIG. 3) so that water may be mixed with detergent or other composition of benefit to washing of garments in wash basket 70.

In response to manipulation of user interface input 141 controller 138 monitors various operational factors of washing machine 50 with one or more sensors or transducers 156, and controller 138 executes operator selected functions and features according to known methods. Of course, controller 138 may be used to control washing machine system elements and to execute functions beyond those specifically described herein. Controller 138 operates the various components of washing machine 50 in a designated wash cycle familiar to those in the art of washing machines. In one embodiment, controller 138 is configured to control motor 120 based on a drag torque sensed on basket 70. Controller 138 is configured to drive motor 120 in a torque-based, rather than a speed-based, mode.

Brake 129 is positionable to either contact (drag) basket 70 or not contact (lift) basket 70. Whenever motor 120 torque exceeds brake assembly 151 back off torque, brake 129 no longer drags. When basket 70 is empty with no imbalance this does not happen until above 800 rpm, but with larger unbalances brake 129 lifts earlier. Once this happens the load to motor 120 is determined by losses attributed to damping in the springs, bearing friction, air resistance (windage), and water drag from entrainment. At large unbalances, the damping friction is the largest contributor to these losses (i.e., drag).

Inverter drive 121 controls at least one operating parameter of motor 120. In one embodiment, inverter drive 121 is configured to control motor 120 to operate at a constant torque. In one embodiment, inverter drive 121 also includes a feed back system (not shown). In the illustrative embodiment, the torque control properties of inverter drive 121 with speed feedback can be used to avoid accelerating a large unbalance above 630 rpm.

Figure 4:
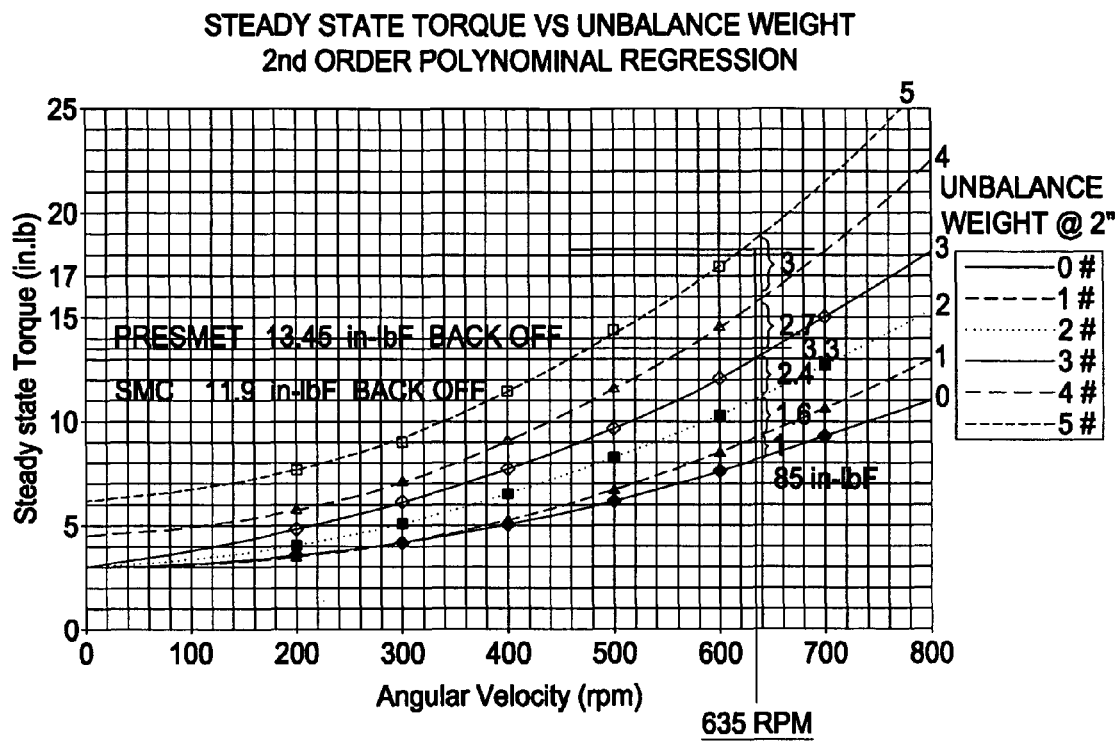
FIG. 4 is an exemplary illustration of a graph of the relationship between steady state torque, velocity, and unbalanced weight.

FIG. 4 is an exemplary illustration of a graph of a relationship between steady state torque, angular velocity, and unbalanced weight. FIG. 4 also shows the drag torque and the back off torque for known brake cams. For example, some known brake cams have a back off torque of about 12.5 in-lbs.

FIG. 4 illustrates that, with 17 in-lbs of torque at transmission 128, a four pound unbalance does not spin above 660 rpm, a three pound unbalance does not spin above about 730 rpm, and a two pound unbalance does spin at 800 rpm.

Figure 5:
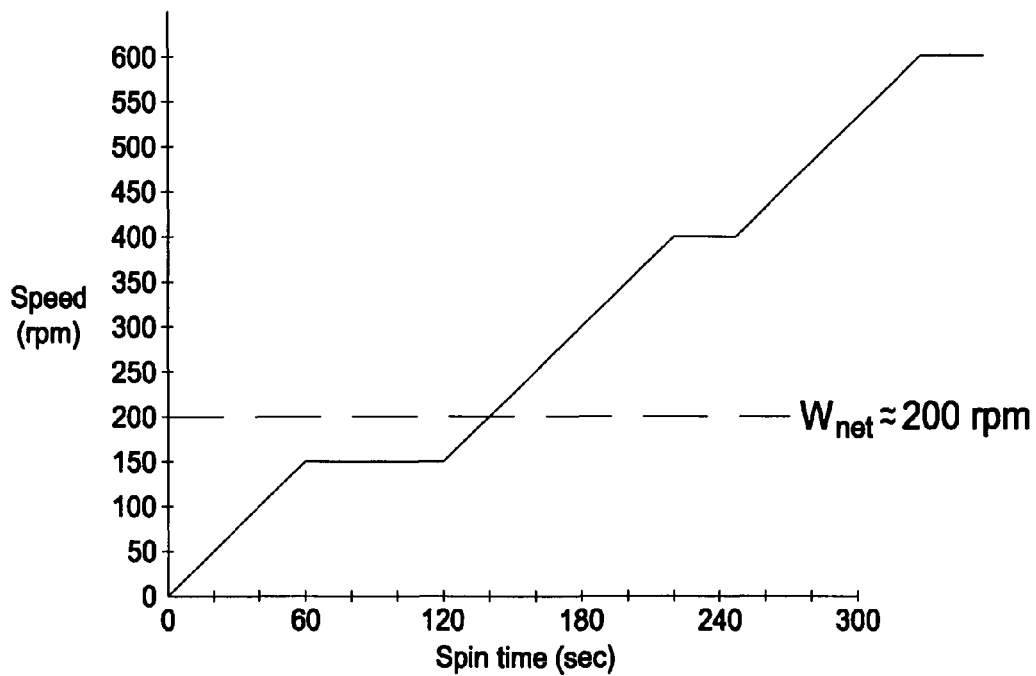
FIG. 5 is an exemplary illustration of a graph of the relationship between velocity and spin time.
Figure 6:
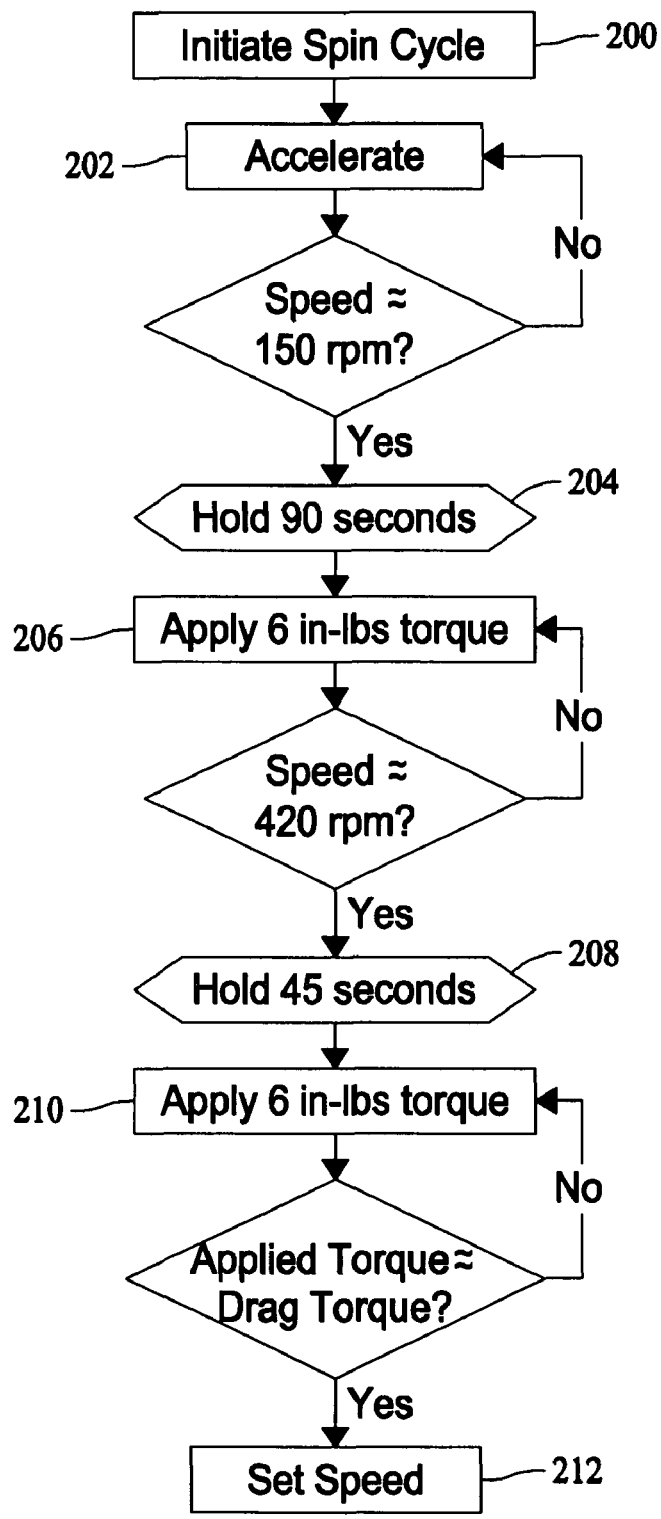
FIG. 6 is a block flow diagram illustrating a method for controlling a spin cycle.

FIG. 5 is an exemplary illustration of a graph of the relationship between velocity and spin time during a spin cycle and FIG. 6 is a block flow diagram illustrating process steps executed by controller 138 (FIGS. 2 and 3) for controlling machine drive system 148 (FIGS. 2 and 3) during the spin cycle operation. In one embodiment, the spin cycle is initiated 200 and basket 70 is accelerated 202 during the spin cycle until it reaches a speed below the natural resonant frequency (NRF) of suspension 92 (FIG. 2) then brake 129 (FIG. 2) is applied 204 for a set period of time (for example, basket 70 rotates at 150 rpm for ninety seconds). Water is removed from the laundry by centrifugal force, thereby reducing the weight of the laundry while basket 70 rotates at a low rpm instead of carrying that weight through the NRF. That is, by extracting water from the laundry load at a low spin speed, the size of the unbalance in basket 70 is reduced prior to accelerating basket 70 above the NRF. After ninety seconds, brake 129 is released and motor 120 is controlled to operate at a constant torque of six in-lbs 206. Motor 120 accelerates basket 70 under the constant six in-lbs of torque until basket 70 reaches a second speed that is above the NRF and is held for a second period of time (for example, basket 70 rotates to 420 rpm and remains for forty-five seconds). Basket 70 continues to accelerate 210 until the torque transmitted or applied to basket 70 from motor 120 is equal to the drag torque on basket 70. Once the applied torque is equal to the drag torque, then for the remainder of the spin cycle, the rpm is set 212.

Rather than holding the drum speed for the time periods described above, microcomputer 140 can be programmed to vary the hold time of the basket speed (i.e., varying the hold time). For example, a balance sensor or a weight sensor can be coupled to microcomputer 140 and positioned such that the resistance of the sensor is representative of the imbalance of the laundry load. Microcomputer 140 can be programmed to vary the hold time of the drum during spin cycle spin up operation based on the sensor's signal. For example, if the drum is canted in respect to vertical axis 118 (shown in FIG. 2) the hold time could be for a longer period of time whereas if the drum is substantial vertical, the hold time could be for a shorter period of time. Of course, other variations are possible.

Furthermore, rather than holding the drum speed at the speeds described above, microcomputer 140 can be programmed to vary the rpm at which the basket 70 rotates (i.e., varying the drum speed). For example, the capacity of the basket 70 and the NRF of suspension 92 can be programmed into microcomputer 140 such that the rpm selected is representative of the capacity of basket 70 and NRF of suspension 92. For example, if basket 70 drum capacity is large or the NRF is high basket 70 maybe rotated at a higher RPM during the hold time whereas if the drum is small and the NRF is low, basket 70 maybe rotated at a lower RPM during the hold time. Of course, other variations are possible The above described methods and systems facilitate reducing damage to sensitive systems in the washing machine, which in turn facilitates increasing the life of the washing machine. Specifically, by avoiding carrying a large unbalance to higher speeds, energy consumption and efficiency is improved and damage to such sensitive systems as the drive and suspension systems are minimized.

While the invention has been described in terms of various specific embodiments, those skilled in the art will recognize that the invention can be practiced with modification within the spirit and scope of the claims.

What is claimed is:

1. A washing machine comprising:
   a cabinet;
   a tub mounted within said cabinet;
   a basket rotationally mounted within said tub for relative rotation therewith;
   a suspension assembly configured to support said tub within said cabinet;
   a variable speed motor for rotating said basket about a rotation axis;
   an inverter operatively coupled to said motor; and
   a controller comprising a microcomputer and a memory coupled to said microcomputer, said controller operatively coupled to said inverter and said motor, said memory storing instructions including at least one step, and said controller, when said microcomputer executes the instructions stored in said memory:
   controls said motor to accelerate said basket to a first rotational speed above a natural resonant frequency (NRF);
   operates said motor at a predetermined constant torque until the predetermined constant torque transmitted to said basket from said motor is substantially equal to a drag torque on said basket; and
   controls said motor to maintain said basket at said first rotational speed for a pre-determined first hold time based on said drag torque on said basket.

2. A washing machine in accordance with claim 1 wherein said predetermined constant torque is approximately six inch-pounds.

3. A washing machine in accordance with claim 1 wherein said controller is configured to control said inverter to operate said motor to accelerate said basket to a second rotational speed below the NRF and hold said basket at said second rotational speed for a second hold time.

4. A washing machine in accordance with claim 1 wherein said controller is configured to control said inverter to operate said motor to accelerate said basket to a third rotational speed above the NRF and hold said basket at said third rotational speed for a third hold time, said third rotational speed faster than said second rotational speed.

5. A washing machine in accordance with claim 1 wherein said controller is configured to control said inverter to operate said motor to accelerate said basket to a fourth rotational speed faster than said third rotational speed.

6. A system for accelerating an unbalanced basket assembly above a natural resonant frequency (NRF) and reducing an out-of-balance condition in a washing machine having a cabinet and a tub enclosing a washer basket rotatably mounted within said tub, said washing machine including a variable speed motor assembly for spinning said basket about a spin axis during a spin cycle, said tub being susceptible to an out-of-balance condition characterized by excursions of said tub in a direction generally perpendicular to said spin axis during said spin cycle, said system comprising:
   an inverter operatively coupled to the variable speed motor; and
   a controller comprising a microcomputer and a memory coupled to said microcomputer, said controller coupled to said inverter, said memory storing instructions including at least one step, wherein said controller, when said microcomputer executes the instructions stored in said memory, directs said inverter to operate said motor to accelerate the basket to a rotational speed below the NRF for a predetermined time period, wherein water is extracted from the basket to reduce a size of the unbalance in the basket prior to accelerating the basket above the NRF, said controller further directs said inverter to operate said motor to accelerate said basket to a first rotational speed above the natural resonant frequency at a predetermined torque until the predetermined torque transmitted to said basket from said motor is substantially equal to a drag torque on said basket and to maintain said basket at the first rotational speed for a predetermined first time period based on said drag torque on said basket.

7. A system in accordance with claim 6 wherein said inverter includes a speed feedback system.

8. A system in accordance with claim 6 wherein said controller is further configured to direct said inverter to operate said motor to accelerate said basket to a second rotational speed above the NRF, and hold said basket at said second rotational speed for a second time period, wherein said second rotational speed is greater than said first rotational speed.

9. A system in accordance with claim 8 wherein said controller is further configured to direct said inverter to operate said motor to accelerate said basket to a third rotational speed above the NRF, wherein said third rotational speed is greater than said second rotational speed.

10. A system in accordance with claim 9 wherein said controller is further configured to direct said inverter to operate said motor to maintain said third rotational speed until completion of said spin cycle.

11. A system in accordance with claim 6 wherein said controller is further configured to direct said inverter to operate said motor at a torque of about six inch-pounds.

* * * * *